Figure 1:
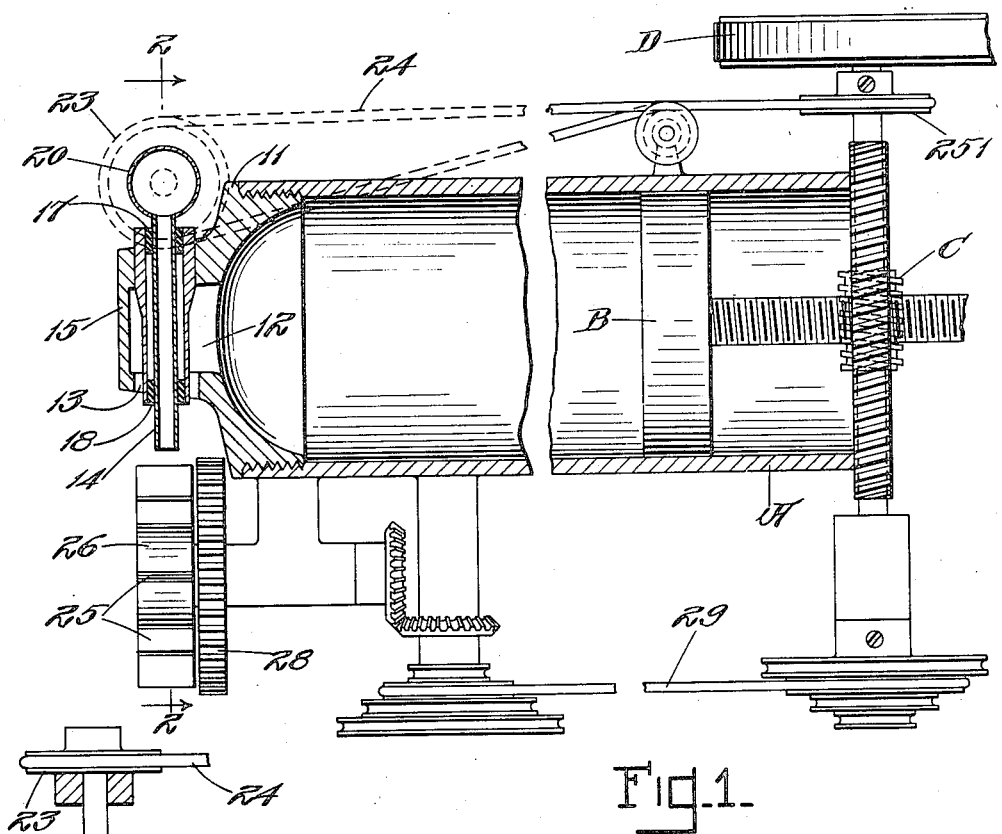

W. B. LASKEY.
PROCESS OF MAKING CANDY.
APPLICATION FILED MAR. 16, 1916.

1,318,292.

Patented Oct. 7, 1919.

INVENTOR:
William B. Laskey
by Macleod, Calver, Copeland & Dike
Attys

UNITED STATES PATENT OFFICE.

WILLIAM B. LASKEY, OF MARBLEHEAD, MASSACHUSETTS.

PROCESS OF MAKING CANDY.

1,318,292.			Specification of Letters Patent.		Patented Oct. 7, 1919.

Original application filed December 28, 1914, Serial No. 879,250. Patent No. 1,242,562, dated October 9, 1917. Divided and this application filed March 16, 1916. Serial No. 84,530.

*To all whom it may concern:*

Be it known that I, WILLIAM B. LASKEY, a citizen of the United States, residing at Marblehead, county of Essex, State of Massachusetts, have invented a certain new and useful Improvement in Processes of Making Candy, of which the following is a specification, reference being had therein to the accompanying drawings.

My invention has for its object an improved process of making candy, and is a division of my prior application filed Dec. 28, 1914, Serial No. 879,250. The candy made in accordance with my improved process is a kind well known to confectioners and consists of a shell or exterior layer of pulled candy, ordinarily of the kind known as "hard boiled candy" filled with some suitable filling mixture which is ordinarily of a pasty or creamy consistency. One filling of this kind is peanut butter, another filling is a properly compounded mixture of which sugar, or glucose, or sugar and glucose, and flavorings, are the chief ingredients. In the past such candy has been made by rolling the filling material up in a flat sheet of pulled candy, then pulling it down to size, and then cutting it into pieces. Candy so made has been very expensive because its manufacture has been essentially a hand process dependent on the skill of the workman for the production of attractive candy, and its high cost has interfered with its popularity.

My new process consists essentially in forcing the plastic candy through a die having an annular orifice of a diameter considerably greater than that of the finished piece then pulling the tube thus produced down to about the required size, and then introducing the filling material through the die to a point in the tube of candy at a distance from the die.

This process and the machine for performing the process make it possible to manufacture candy of this kind by machine continuously and the hands of the workman do not come in contact with the candy at all. The machine is entirely automatic so that the results are practically independent of the skill of the workman.

It is also possible to make candy having a shell much thinner than has heretofore been possible. This is advantageous, because the goods are thereby made more attractive and palatable, and also because the expense is reduced.

In the following specification, I have referred to the exterior layer as the shell, and to it as being tubular in form. I have also referred to the die as annular. I wish to be understood however as including by the word "tubular" all the various forms of cross sections of candy which have a shell within which is contained filling material. This description is also intended to include filled chips, etc. The shell is preferably made of "hard candy" that is, a candy boiled to a relatively high temperature. Such candy is brittle when cold and becomes hard and stiff by a relatively small drop in temperature.

Also, in the following description, I have referred to the fact that the filling material is of a temperature considerably below that of the shell whereby the shell is chilled and partially set when the filling material contacts with it. The shell is made in tubular form by being forced through a die while at a relatively high temperature, its diameter being then larger than that of the finished piece and it is then pulled down to final size. The temperature of the shell when it leaves the die is upward of 100° Fahr. and in practice about 150° Fahr. The temperature of the filling material may be the temperature of the room or possibly slightly above it, resulting from its proximity to the heated candy from which the shell is made. The temperature of the filling is therefore from 65° to 80 or 85°, it being preferable that the filling material be kept at a fairly low temperature by artificial means if necessary. The relatively cold filling material is introduced through the die into the tube of candy but is not permitted to contact with the walls of the shell until at about the point where the shell has been pulled down to its final diameter. This is done because the cold filling chills the shell, and thereafter additional tension does not have the effect of reducing its diameter at that point.

My invention will be fully understood by reference to the following description taken in connection with the accompanying drawings, and the novel features thereof are pointed out and clearly defined in the claims at the close of this specification.

In the drawings, Figure 1 is a horizontal section of a machine such as is used in carrying out the invention.

Figure 2:
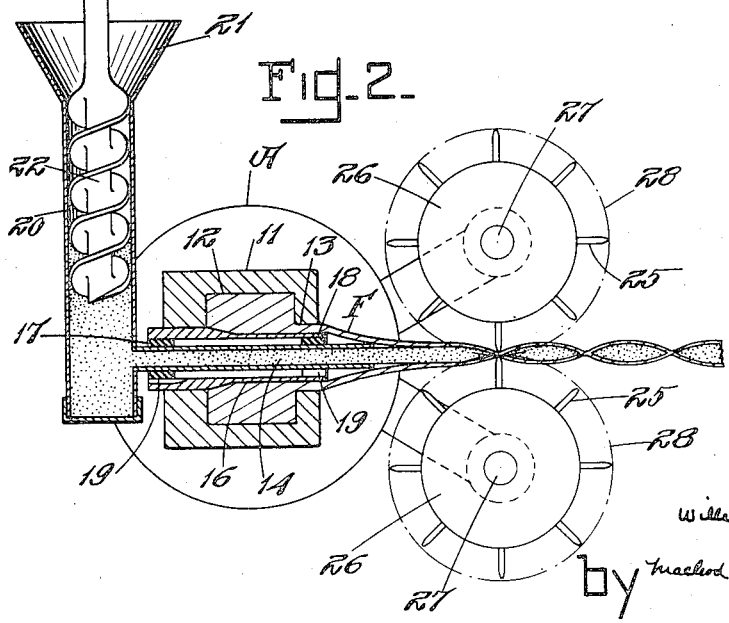

Fig. 2 is a vertical section on line 2—2 of Fig. 1, looking in the direction of the arrows.

Referring to the drawings, at A is shown a main cylinder and at B the piston operated by a worm and gear C driven by the main driving belt D. The candy from which the shell is made is placed within the cylinder A and is forced under heavy pressure through a nozzle 11 by means of the piston B. The candy from which the shell is made has already been boiled to the proper temperature, partly cooled and pulled in the manner employed in the manufacture of hard candy. At 11 is shown the nozzle, the cylinder head being screwed onto the cylinder A. This nozzle is made of considerable strength to be capable of withstanding the heavy pressure to which the candy is subjected. At 12 is shown a part of the passageway through the nozzle, and at 13 is shown the orifice through which the candy is emitted. This orifice 13 is of any convenient shape. For making candy which is cylindrical in cross section, the orifice will be circular. If the candy is flat, the die will be of corresponding shape. It will be seen that the pressure placed on the candy by the piston B forces the candy out through the orifice 13 in a tubular form. The diameter of this tube is considerably larger than that of the finished piece so that it may be pulled down to give to the surface of the candy the necessary luster or sheen since the candy if not pulled down will have a vitreous appearance, which is less attractive to the purchaser.

As has been stated already, the filling material is introduced into the shell or tube F of candy when it has been partially pulled down. This is done in the following manner.

At 14 is shown the filling nozzle which consists of a tube extending from side to side through the projection 15 on the cylinder head 11. This tube is contained within the tube 16, the exterior of which forms a part of the die or orifice through which the shell is forced. The filling nozzle 14 is preferably insulated as shown at 17 and 18 from the tube 16 and is separated therefrom by an air space so that the heat from the candy will not be communicated to the filling material. One or more air holes 19 are also provided to permit the flow of air into the interior of the tube of candy so that it will not be collapsed by the pressure of the outer air. The filling nozzle 14 communicates with the feed cylinder 20 provided at its upper end with a funnel 21. Within this feed cylinder 20 is some suitable feeding or forcing element 22, as for instance, a screw by means of which the filling material is forced downwardly and out through the filling nozzle 14. The screw is conveniently driven by a pulley and belt 23, 24, said belt passing over a pulley 251 on the main shaft. It will be noticed that the filling nozzle 14 projects beyond the orifice 13 for a considerable distance, and that the stream of filling material from the nozzle does not contact with the shell or tube of candy until the candy has passed some little distance out of the orifice. This is an important feature of the invention because the filling material chills the thin tube of hard candy and harddens or sets it somewhat so that it cannot thereafter be pulled down although it is still somewhat plastic. This is no doubt due to the fact that the candy as it emerges from the die is softer than the candy after the filling material has contacted with it and therefore the chilled portion of the candy has sufficient strength or rigidity to resist a pulling strain which is sufficient to elongate the unchilled portion of the candy.

The pulling down is conveniently done by means of traveling cutting and pulling members. In the drawings I have shown a pair of drums 26 each provided with eight blunt-edged members 25. These two drums are mounted on shafts 27, and are geared together by gears 28. One of the shafts 27 is driven from the main shaft of the machine, by means of a belt drive 29. The belt drive is preferably made to run at variable speeds so that the drums may be run faster or slower as the case may be. The cutting and pulling members are speeded to have a peripheral speed greater than the speed of the candy as it emerges from the die 13. The pairs of blunt-edged members 25 successively engage the sides of the candy, compress it slightly between them and as they move farther pull out the candy thereby reducing its size and giving it the necessary silky luster. The cutting and pulling members are usually set so that the members composing each set do not quite contact with each other. They therefore only mark the candy at successive intervals. If brought nearer together they will act as cutters. The candy is so brittle when fully cooled that the adjacent pieces fall apart without any additional operation. One series of traveling pulling members and an abutment cooperating therewith is all that is necessary to successful operation of this part of the machine, but of course a second series of traveling pulling members such as is formed by the pulling members on the other drum is the most satisfactory form of abutment to be employed.

The amount of filling material introduced into the tube of candy can be easily regulated by varying the speed of the forcing member 22. If for instance a candy having a very large bulk is desired, that is, a candy of large bulk and small weight, the forcing member will be run very slowly so that the shell will be only partly filled with the filling material. On the other hand, and under ordinary conditions, the forcing member will be run at a speed just sufficient to completely fill the shell. The action of the cutting and pulling members pinches together the ends of the shell of each piece while the candy is still in somewhat plastic condition and therefore prevents any leakage of the filling material in case it is in a semi-fluid condition.

What I claim is:

1. The process of making candy which consists in forcing candy through an annular opening to form a tubular structure of a diameter greater than the finished piece and then pulling the candy down to size and subsequently thereto introducing filling material through the open end of the candy.

2. The process of making candy which consists in forcing candy through an annular opening to form a tubular structure of a diameter greater than the finished piece and then pulling the candy down to size and introducing filling material through the open end of the candy to a point in the tubular structure at a distance from the opening through which said candy was forced.

3. The process of making candy which consists in forcing candy through an annular opening to form a tubular structure of a diameter greater than the finished piece and then pulling the candy down to size and introducing filling material through the open end of the candy to a point in the tubular structure at a distance from the opening through which said candy was forced and while the pulling is taking place.

4. The process of making candy which consists in forcing candy through an annular opening to form a tubular structure of a diameter greater than the finished piece and then pulling the candy down to size and introducing filling material through the open end of the tubular structure said filling material being of a temperature considerable below that of the tubular structure whereby the candy is stiffened upon contacting with the filling material.

In testimony whereof I affix my signature, in presence of a witness.

WILLIAM B. LASKEY.

Witness:
ALICE H. MORRISON.